US008325256B2

(12) United States Patent
Egawa

(10) Patent No.: US 8,325,256 B2
(45) Date of Patent: Dec. 4, 2012

(54) SOLID-STATE IMAGING DEVICE

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 12/883,819

(22) Filed: Sep. 16, 2010

(65) Prior Publication Data

US 2011/0085065 A1  Apr. 14, 2011

(30) Foreign Application Priority Data

Oct. 8, 2009 (JP) ................. 2009-234255

(51) Int. Cl.
  *H04N 5/335* (2011.01)
(52) U.S. Cl. .................. 348/297; 348/229.1
(58) Field of Classification Search .......... 348/294
  See application file for complete search history.

(56) References Cited

U.S. PATENT DOCUMENTS

| | | | | |
|---|---|---|---|---|
| 6,323,900 | B1* | 11/2001 | Kobayashi | 348/241 |
| 2008/0218619 | A1* | 9/2008 | Egawa | 348/296 |
| 2008/0252742 | A1* | 10/2008 | Oike | 348/222.1 |

FOREIGN PATENT DOCUMENTS

| | | |
|---|---|---|
| JP | 2001-177775 | 6/2001 |
| JP | 2008-271278 | 11/2008 |
| JP | 2008-271279 | 11/2008 |
| JP | 2010-226679 | 10/2010 |

OTHER PUBLICATIONS

U.S. Appl. No. 13/421,316, filied Mar. 15, 2010, Egawa.

* cited by examiner

*Primary Examiner* — Chieh M Fan
*Assistant Examiner* — Wesley J Chiu
(74) *Attorney, Agent, or Firm* — Oblon, Spivak, McClelland, Maier & Neustadt, L.L.P.

(57) ABSTRACT

According to one embodiment, a solid-state imaging device includes, a pixel section, a read pulse amplitude control unit which controls exposure time for which a photo diode carries out the photoelectric conversion and dividing the signal charge accumulated in the photo diode into fractions so that the fractions are read from the photo diode, a plurality of line memories to which the plurality of read signals are saved. And the device further includes an addition unit which synthesizes the plurality of read signals into one signal, the addition unit includes first determination unit which reads the signal saved to the predetermined line memory and comparing a signal level of the read signal with a predetermined level to determine whether or not to add a signal read from a different line memory to the compared signal.

2 Claims, 12 Drawing Sheets

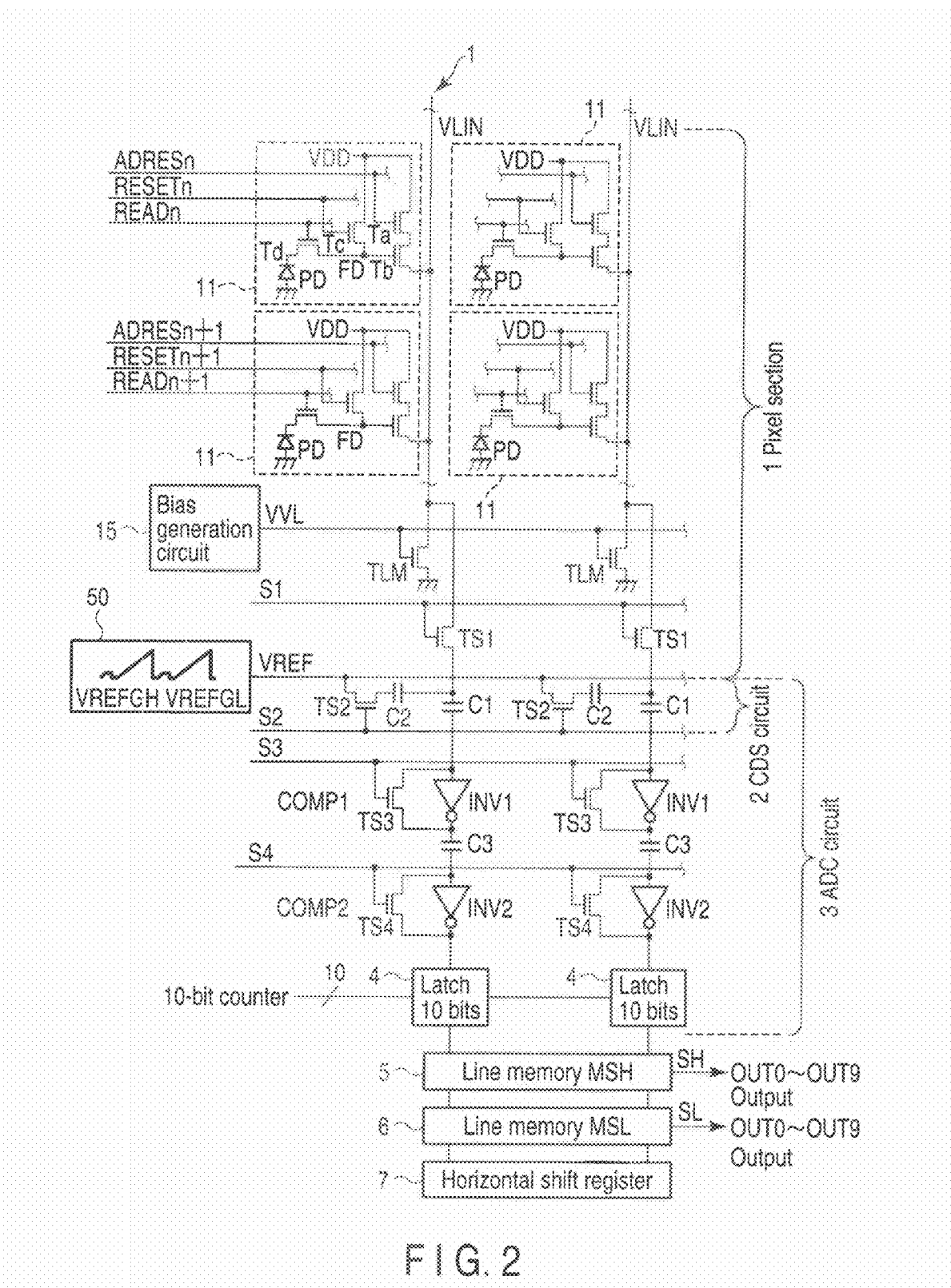
F I G. 2

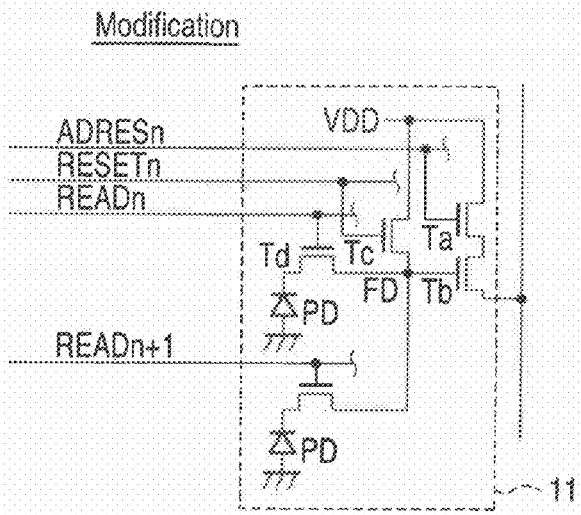
FIG. 12
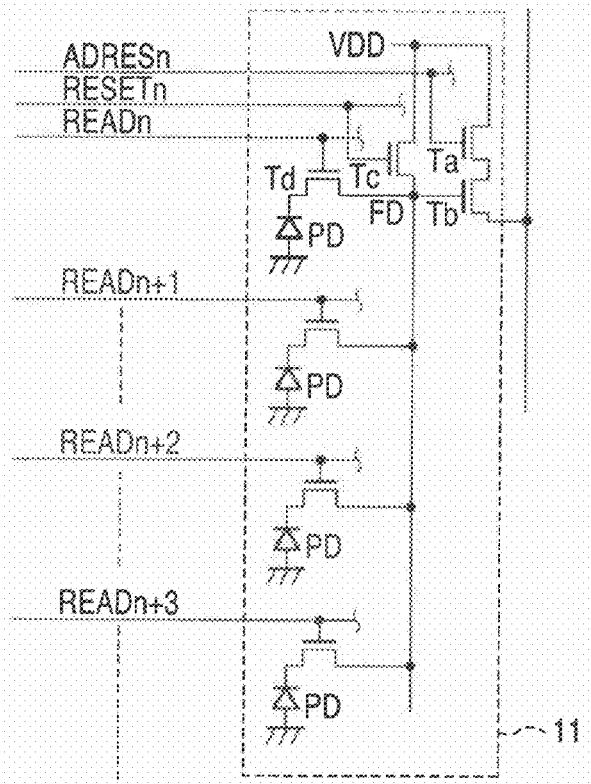
FIG. 13
FIG. 14

SOLID-STATE IMAGING DEVICE

CROSS-REFERENCE TO RELATED APPLICATIONS

This application is based upon and claims the benefit of priority from Japanese Patent Application No. 2009-234255, filed Oct. 8, 2009; the entire contents of which are incorporated herein by reference.

FIELD

Embodiments described herein relate generally to a solid-state imaging device such as a CMOS image sensor.

BACKGROUND

Several ideas propose methods of dividing a signal from a photo diode (PD) in a solid-state imaging device such as a CMOS image sensor, into fractions so that the fractions can be read.

BRIEF DESCRIPTION OF THE DRAWINGS

FIG. 2 is a diagram showing a configuration example of a pixel section, an ADC circuit, a CDS circuit in the solid-state imaging device according to the first embodiment;

FIG. 12 is an equivalent circuit diagram showing a configuration example of a pixel according to a modification;

FIG. 13 is an equivalent circuit diagram showing a configuration example of a pixel according to a modification; and FIG. 14 is an equivalent circuit diagram showing a configuration example of a pixel according to a modification.

DETAILED DESCRIPTION

Figure 1:
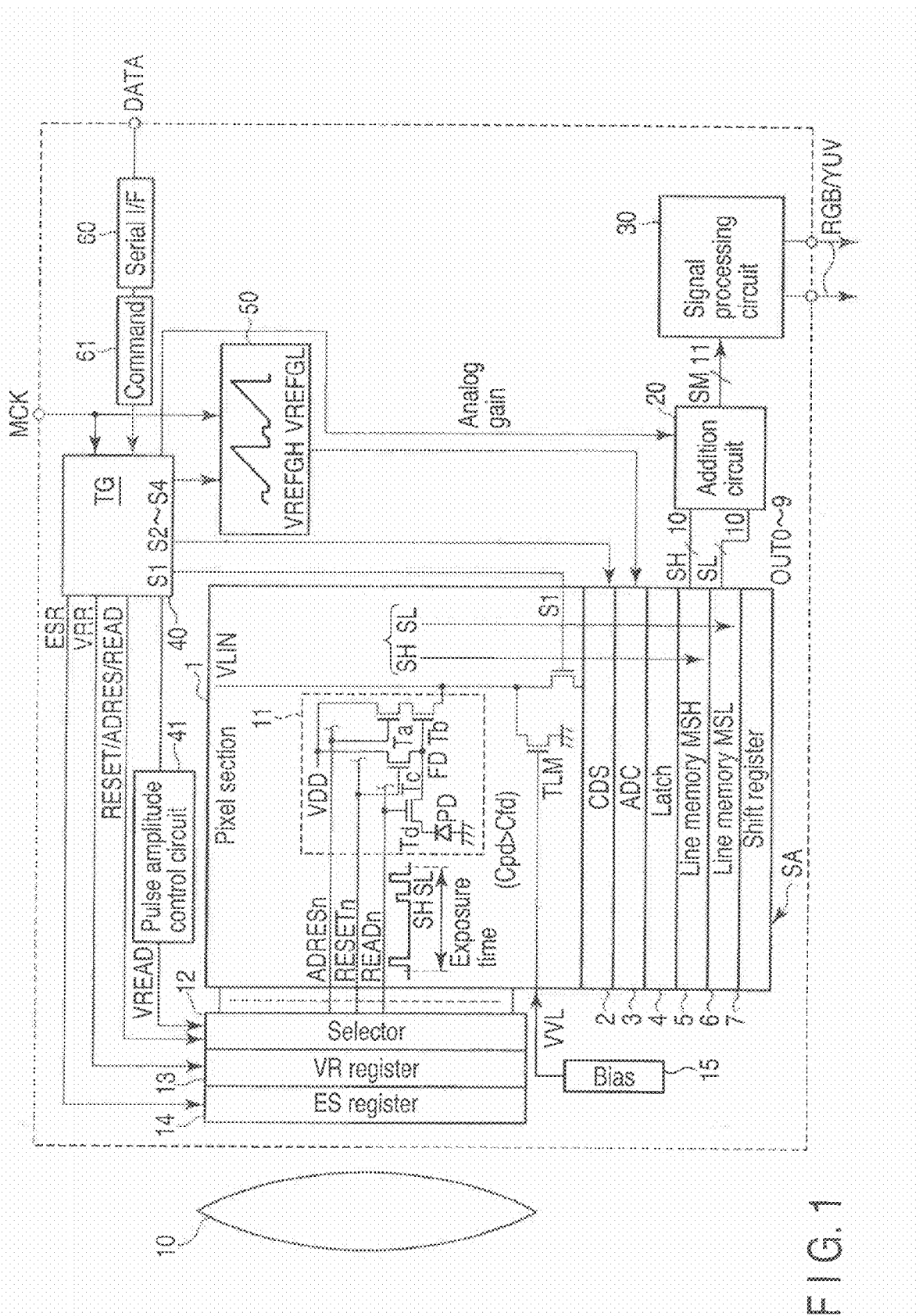
FIG. 1 is a block diagram showing a general configuration example of a solid-state imaging device according to a first embodiment.

In general, according to one embodiment, a solid-state imaging device comprises: a pixel section comprising a plurality of cells arranged on a semiconductor substrate and each comprising a photo diode configured to photoelectrically convert an optical signal into a signal charge, a read unit which reads the signal charge generated by the photo diode, out to a detection section, a output unit which converts the signal charge into a voltage corresponding to a charge amount and then outputting the voltage, and a reset unit which resets the detection unit; a read pulse amplitude control unit which controls exposure time for which the photo diode carries out the photoelectric conversion and dividing the signal charge accumulated in the photo diode into fractions so that the fractions are read from the photo diode; a plurality of line memories to which the plurality of read signals are saved; and an addition unit which synthesizes the plurality of read signals into one signal, the addition unit comprising first determination unit which reads the signal saved to the predetermined line memory and comparing a signal level of the read signal with a predetermined level to determine whether or not to add a signal read from a different line memory to the compared signal.

Here, the above-described ideas have the following tendency. For example, an operation of reading a signal remaining in PD (photo diode) prevents the number of saturation electrons in PD from being significantly increased.

For example, whether or not to add signals together is controlled using a reference level, a signal level, and a level determination circuit. The reference level is set based on an estimated maximum charge amount. However, the maximum charge amount varies depending on a variation in device manufacturing, an operating temperature, and the like. Furthermore, each sample can be measured in order to set the reference level for the sample. However, this increases test costs. Moreover, if the photo diode (PD) is of a perfect transfer type, the last of the read signals resulting from the division involves a large maximum charge amount for each pixel. This tends to increase the magnitude of errors in level determination, resulting in an irregular fixed pattern.

In the above-described proposals, even if the signals resulting from the division are small, the addition of the signals corresponds to the addition of only random noise, which involves substantially no signal. This tends to result in an increase in noise and a decrease in S/N (Signal/Noise) ratio.

Thus, in the following embodiments, a solid-state imaging device will be described which enables noise to be reduced to advantageously prevent a decrease in S/N (Signal/Noise) ratio even if the signals resulting from the division are small.

The embodiments will be described below with reference to the drawings. In the present example, an amplified CMOS image sensor will be described as an example of a solid-state imaging device. In the description, common components are denoted by common reference numerals throughout the drawings.

First Embodiment

A solid-state imaging device according to a first embodiment and the operation of the solid-state imaging device will be described with reference to FIG. 1 to FIG. 5.

<1. Configuration Example>

1-1. General Configuration Example

First, a general configuration example of a solid-state imaging device according to a first embodiment will be described with reference to FIG. 1.

As shown in FIG. 1, the following are arranged in a sensor core section of the solid-state imaging device in the present example: a pixel section 1, a column type noise cancellation circuit (CDS) 2, a column type analog digital converter (ADC) 3, a latch circuit 4, two line memories (MSH5 and MSL6), and a horizontal shift register 7. A photo diode has a large capacitance Cpd, and a detection section has a small capacitance Cfd (Cpd>Cfd). That is, the capacitance Cpd of the photo diode is designed to be larger than that Cfd of the detection section.

Light enters the pixel section 1 via a lens 10. The pixel section 1 then photoelectrically converts the incident light to generate charge corresponding to the quantity of the light. In the pixel section 1, a plurality of cells (unit pixels) 11 are two-dimensionally arranged on a semiconductor substrate in rows and columns, that is, in a matrix. Each cell comprises four transistors (Ta, Tb, Tc, and Td) and a photo diode (PD) and is supplied with pulse signals ADRESn, RESETn, and READn. Load transistors TLM for source follower circuits are arranged under the pixel section 1 along a horizontal direction. One end of a current path in each load transistor TLM is connected to a corresponding vertical signal line VLIN. The other end is connected to a ground point. The vertical signal line VLIN is connected to a CDS circuit via a switch S1.

A pulse amplitude control circuit 41 is provided to allow the supply of a three-valued level serving as a READ pulse. An output VREAD power source for the pulse control circuit 41 supplies power to a READ pulse output circuit for a selector circuit 12. The pulse amplitude control circuit 41 controls the power supply voltage to generate a three-valued level. This will be described below in detail.

An analog signal corresponding to signal charge generated by the pixel section 1 is supplied to ADC 3 via CDS 2. ADC 3 converts the analog signal into a digital signal, which is then latched in a latch circuit 4. Digital signals latched in the latch circuit 4 are sequentially read, by a horizontal shift register 7, from a sensor core section SA via line memories (MSH and MSL). Two 10-bit digital signals OUT0 to OUT9 (SH and SL) read from the line memories (MSH and MSL) are added together by an addition circuit 20 to generate one 11-bit signal SM. The input signal SM is subjected to normal signal processing by a signal processing circuit 30. The resultant signal is output to an external device as an output signal from the solid-state imaging device.

A pulse selector circuit (selector), a vertical register (VR register) 13 for signal read, and a vertical register (ES register) 14 for accumulation time control are arranged adjacent to the pixel section 1.

Reads from the pixel section 1 and control of the CDS circuit 2 are carried out by a timing generator TG. The timing generator TG performs the above-described control using pulse signals S1 to S4, READ, RESET/ADRES/READ, VRR, and ESR. The pulse signals S2 to S4 are supplied to the CDS circuit 2. The pulse signals RESET/ADRES/READ are input to the pulse selector circuit 12. The pulse signal VRR is supplied to the VR register 13, and the pulse signal ESR is supplied to the ES register 14. The registers 13 and 14 select a vertical line from the pixel section. Then, a pulse signal RESET/ADRES/READ (in FIG. 1, the pulse signal is typically shown by RESETn, ADRESn, and READn) is supplied to the pixel section 1.

The pulse signal (address pulse) ADRESn is supplied to a gate of the row selection transistor Ta in the cell 11. The pulse signal (reset pulse) RESETn is supplied to a gate of the reset transistor Tc in the cell. The pulse signal (read pulse) READn is supplied to a gate of the read transistor Td in the cell. The pixel section 1 is supplied with a bias voltage VVL from a bias generation circuit (bias 1). The bias voltage VVL is supplied to a gate of the load transistor TLM for the source follower circuit.

The VREF generation circuit 50 operates in response to an externally input main clock signal MCK to generate a reference waveform for AD conversion (ADC). The amplitude of the reference waveform is controlled by data DATA externally input to a serial interface (serial I/F) 60. The command input to the serial interface 60 is supplied to a command decoder 61. The command decoder 61 then decodes the command and supplies the decoded command to the timing generator TG together with the main clock signal MCK.

The VREF generation circuit 50 generates and supplies triangular waves VREFGH and VREFGL to ADC 3 in order to perform two AD conversions during one horizontal scan period. During the former VREF amplitude, the first input signal is subjected to an AD conversion at a 1,023 level. During the same VREF amplitude, the second, different input signal is subjected to an AD conversion at the 1,023 level. Then, during the next horizontal period, the signals SH and SL are simultaneously read from the line memories and added together to generate one signal SM.

1-2. Configuration Examples of the Pixel Section, ADC, and CDS

Now, more specific configuration examples of the pixel section 1, CDS circuit 2, and ADC circuit 3 in the amplified CMOS image sensor shown in FIG. 1 described above.

As shown in FIG. 2, each of the cells (pixels) 11 in the pixel section 1 comprises the row selection transistor Ta, the amplified transistor Tb, the reset transistor Tc, the read transistor Td, and the photo diode PD. Current paths in the transistors Ta and Tb are connected in series between a power source VDD and a vertical signal line VLIN. The gate of the transistor Ta is supplied with the pulse signal ADRESn. A current path in the transistor Tc is connected between the power source VDD and a gate (detection section FD) of the transistor Tb. The gate of the transistor Tc is supplied with the pulse signal RESETn. Furthermore, one end of a current path in the transistor Td is connected to the detection section FD. The gate of the transistor Td is supplied with the pulse signal READn. A cathode of the photo diode PD is connected to the other end of the current path in the transistor Td. An anode of the photo diode PD is grounded.

The cells 11 configured as described above are two dimensionally arranged in rows and columns so as to form the pixel section 1. The load transistors TLM for source follower circuits are arranged under the pixel section in the horizontal direction. The current paths in the load transistors TLM are connected between the vertical signal line VLIN and the ground point. The bias voltage VVL from the bias generation circuit is applied to the gate of the load transistor TLM.

Capacitances C1 to C3 for a noise canceller are arranged in the CDS circuit 2 and the ADC circuit 3. A transistor TS1, a transistor TS2, and two comparator circuits COMP1 and CMP2 are also arranged in the CDS circuit 2 and the ADC circuit 3; the transistor TS1 is configured to transmit signals on the vertical signal line VLIN, and the transistor TS2 is configured to receive a reference waveform for AD conversion. A capacitor C3 is connected between the comparator circuits CMP1 and CMP2. The comparator circuit COMP1 comprises an inverter INV1 and a transistor TS3 with a current path connected between an input end and an output end of the inverter INV1. The comparator circuit COMP2 comprises an inverter INV2 and a transistor TS4 with a current path connected between an input end and an output end of the inverter INV2. A gate of the transistor TS1 is supplied with the pulse signal S1 output by the timing generator. A gate of the transistor TS2 is supplied with the pulse signal S2 output by the timing generator. A gate of the transistor TS3 is supplied with the pulse signal S3 output by the timing generator. A gate of the transistor TS4 is supplied with the pulse signal S4 output by the timing generator. The digital signal output by the comparator circuit COMP2 is latched in the latch circuit 4.

The latched signal is then input to two line memories 5 and 6. Line memory signals operate the shift register, and the two line memories sequentially output 10-bit digital signals OUT0 to OUT9.

In the above-described configuration, for example, to allow a signal on an (n) line of the vertical signal lines VLIN to be read, the pulse signal ADRESn is set to an "H" level to operate the source follower circuit comprising the amplified transistor Tb and the load transistor TLM. The signal charge obtained through the photoelectric conversion by the photo diode PD is accumulated for a given period. Before readout, in order to remove noise signals such as dark current from the detection section FD, the pulse signal RESETn is set to the "H" level to turn on the transistor Tc. Thus, the detection section FD is set to the VDD voltage=2.8 V. Hence, a voltage (reset level) corresponding to the absence of signals in the detection section FD serving as a reference is output to the vertical signal line VLIN. At this time, the pulse signals S1, S3, and S4 are set to the "H" level to turn on the transistors TS1, TS3, and TS4, respectively. Thus, the AD conversion levels of the comparator circuits COMP1 and COMP2 in ADC3 are set. Furthermore, charge the amount of which corresponds to the reset level of the vertical signal line VLIN is accumulated in the capacitance C1.

Then, the pulse signal (read pulse) READn is set to the "H" level to turn on the transistor Td. Thus, the signal charge generated and accumulated by the photo diode PD is read to the detection section FD. Hence, the voltage (signal+reset) level of the detection section FD is read to the vertical signal line VLIN. At this time, the pulse signals S1 and S2 are set to the "H" level, and the pulse signals S3 and S4 are set to an "L" level. Then, the transistors TS1 and TS2 are turned on, and the transistors TS3 and TS4 are turned off. Thus, charge corresponding to the "signal on the vertical signal line VLIN+reset level" is accumulated in the capacitance C2. At this time, an input end of the comparator circuit COMP1 is in a high impedance state. Hence, the capacitance C1 remains at the reset level.

Thereafter, the level of a reference waveform output by the VREF generation circuit is increased (the triangular-wave VREF is increased from a low level to a high level) to allow the comparator circuits COMP1 and COMP2 to perform AD conversion via the synthesized capacitance of the capacitances C1 and C2. The triangular wave is generated at 10 bit (0 to 1023 level), and the AD conversion level is determined by a 10-bit counter, with the data held in the latch circuit. After the AD conversion at the 1,023 level, the data in the latch circuit is transferred to the line memories. The polarity of the reset level accumulated in the capacitance C1 is opposite to that of the reset level accumulated in the capacitance C2. Thus, the reset levels are cancelled, and the AD conversion is performed substantially by the signal components of the capacitance C2. The operation of removing the reset levels is called a noise reduction processing operation (CDS operation: Correlated Double Sampling). To allow the AD conversion operation to be performed twice during one horizontal scan period, the VREF generation circuit generates and supplies triangular waves VREFGH and VREFGL to one end of the current path in the transistor TS2. A digital signal resulting from the AD conversion with the former VREFGH is held in the line memory MSH5. On the other hand, a digital signal resulting from the AD conversion with the latter VREFGL is held in the line memory MSL6. The two signals are simultaneously read during the next horizontal scan period.

1-3. Configuration Example of the Addition Circuit

Now, with reference to FIG. 3, a configuration example of the addition circuit 20 shown in FIG. 1 described above will be described.

Figure 3:
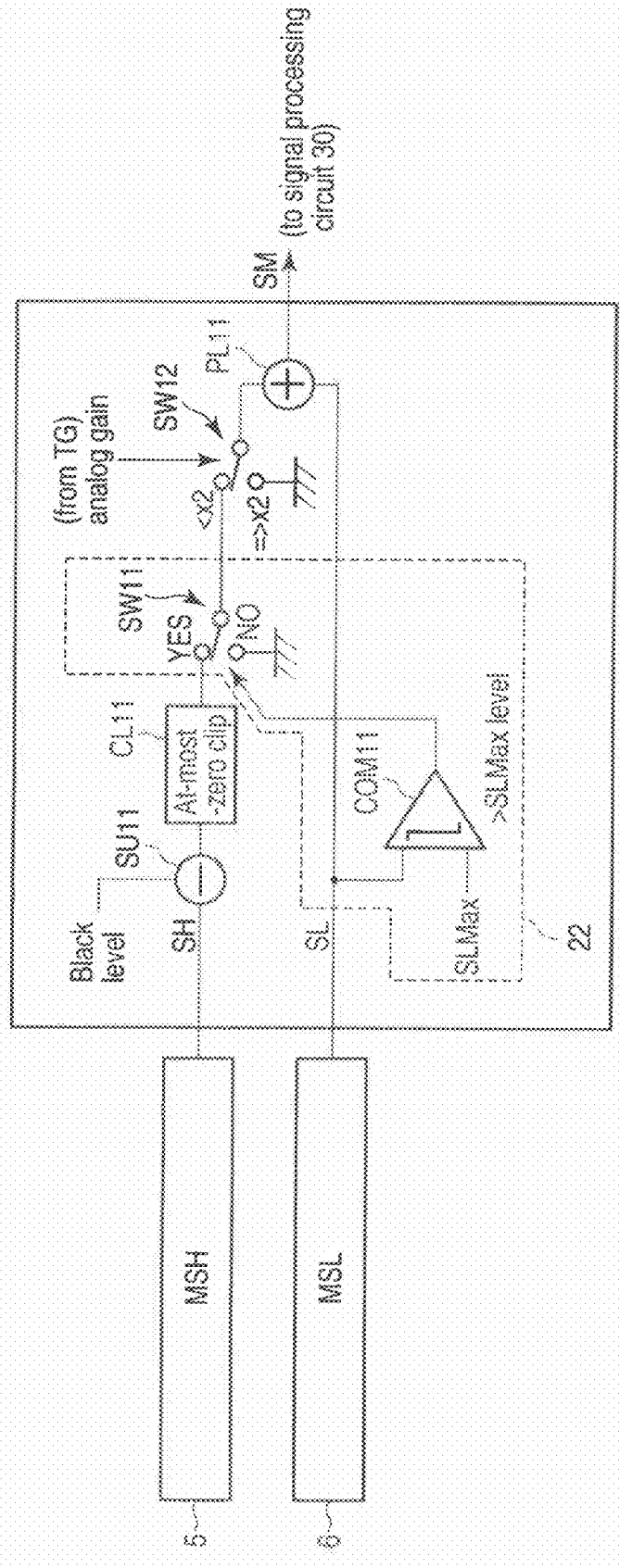
FIG. 3 is a diagram showing a configuration example of an addition circuit according to the first embodiment.

As shown in FIG. 3, the addition circuit 20 in the present example comprises a comparator circuit COM11, switches SW11 and SW12, a subtractor SU11, a clip circuit CL11, and an adder PL11.

Here, the comparator COM11 and the switch 11 form a first determination circuit 22 configured to perform comparison of the signal level (SL) of the last of a plurality of read signals resulting from division to determine whether or not to add any previously read signal (SH) to the last signal. The plurality of line memories MSH5 and MSL6 are provided to carry out this process.

More specifically, the comparator circuit COM11 compares the signal SL read from the line memory MSL6 with a signal SLMax of a predetermined level. If the signal SL is greater than the signal SLMax, the control switch SW11 is set to a YES side. Thus, the signal SH is added to the signal SL. On the other hand, if the signal SL is smaller than the signal SLMax, the switch SW11 is set to a NO side. Thus, the signal SH is prevented from being added to the signal SL. Here, for example, the predetermined level SLMax is set to about 4,000 ele when the SL signal is about 5,000 ele at a maximum. This prevents the signal SH from being added to the signal SL with a value lower than 4,000 element.

Thus, the configuration in the present example performs control such that if the signal SL is smaller than the predetermined signal SLMax, the switch SW11 is set to the NO side to prevent the signal SH from being added to the signal SL. This in turn enables the mixture of random noise to be prevented. As a result, even if the signals resulting from the division are small, random noise can be reduced. Thus, advantageously, the S/N (Signal/Noise) ratio is prevented from being reduced.

The signal SH read from the line memory MSH5 is input to the subtractor SU11, which first reduces the black level of the signal SH. For example, if the black level is set to 64 LSBs in an ADC count, subtraction is carried out on the 64 LSBs.

A minus signal input by the subtractor Still is clipped by an at-most-zero clip circuit CL11, thus reducing random noise to about half. Here, for example, at a signal level of at least 4,000 ele, random noise may be added. However, light shot noise at a signal level of 4,000 ele can be calculated using square root; $\sqrt{(4000)}=63$ ele. At this time, for random noise generated without the SH signal, noise from the source follower circuit in the pixel section 1 is dominant and corresponds to 2 ele. Since the random noise is reduced to half when signals with a value of at most zero is clipped by the clip circuit CL11, the resultant random noise is 1 ele. This level is about 1/63 of the signal and is low. Thus, the noise cannot substantially be detected in images. Moreover, if the quantity of light decreases, an effect corresponding in practice to an increase in analog gain can be exerted by reducing the amplitude of the reference voltage VREF of ADC 3.

In the illustrated configuration in which the addition circuit 20 divides the signal into two fractions before readout, if the analog gain is at least doubled, only the SL signal is used. Thus, if the analog gain is at least doubled ($\geq \times 2$), the switch SW12 is set to a GND side so as to prevent the SH signal from being supplied to the addition circuit 20. Thus, the SH signal is not substantially added. As a result, at a signal level of at most 4,000 ele, an increase in random noise can be prevented. For example, at 4,000 ele or higher, the random noise increases by about 1 ele. However, this value is at a sufficiently low level compared to the light shot noise and is thus negligible in a practical sense.

An input of the adder PL11 is connected to an output from the switch SW12 and to the signal SL. The adder PL11 thus adds the output from the switch SW12 and the signal SL together and outputs the sum to the signal processing circuit 30.

<2. Operation Example>

2-1. Read Operation

Figure 4:
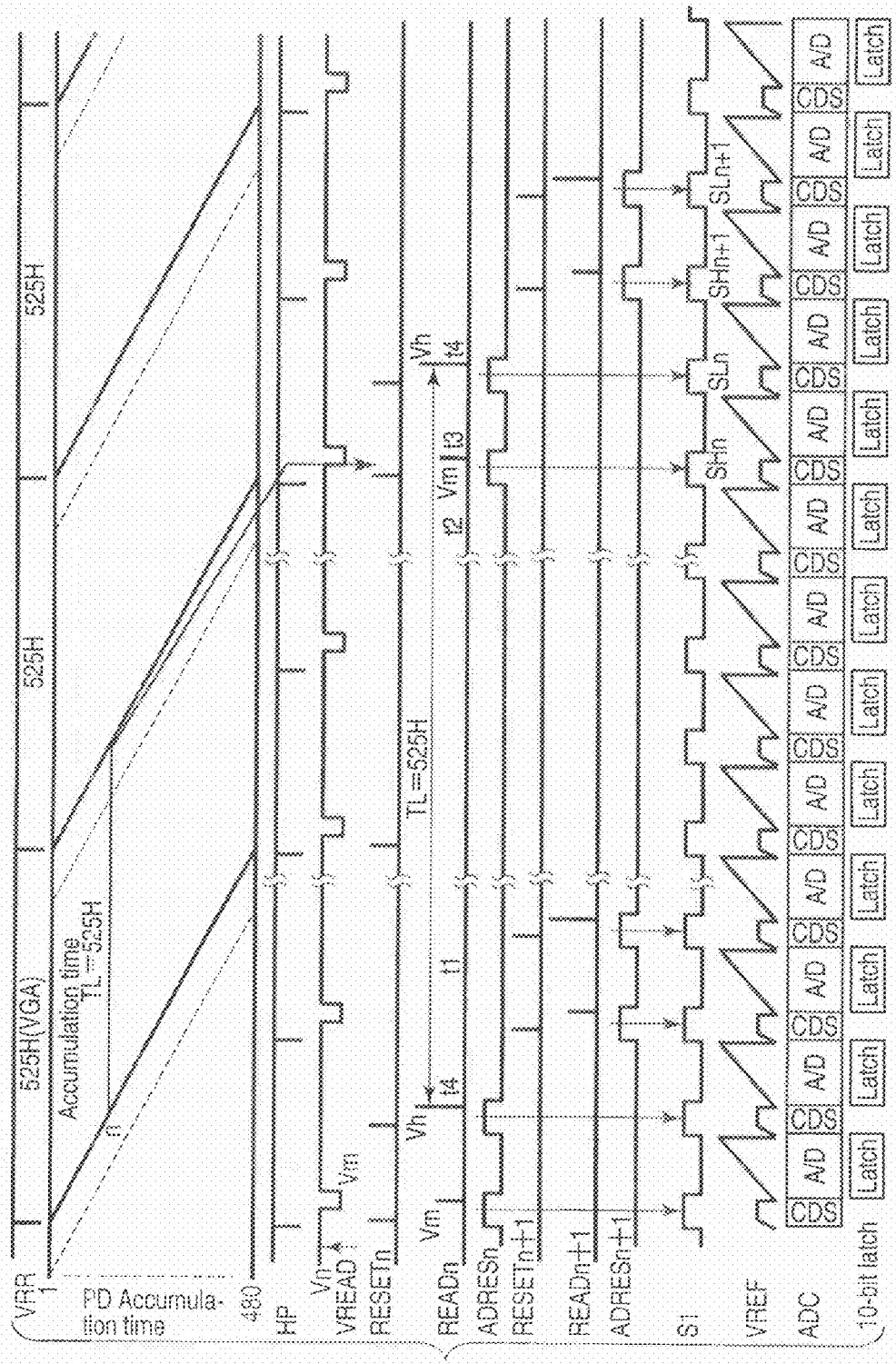
FIG. 4 is a timing chart illustrating a read operation performed by the solid-state imaging device according to the first embodiment.

Now, a read operation performed by the solid-state image pickup device will be described with reference to operational timings shown in FIG. 4. For the sensor in the present example, the number of pixels corresponds to VGA. Thus, signal charge is accumulated through photoelectric conversion performed by the photo diode PD on the (n) vertical line, with the accumulation time set to the maximum value, TL=525 H, for low illuminance image taking. Control is performed with the amplitude of the read pulse READ set to a high level (2.8 V). The accumulation time TL can be controlled every hour by the ES register. Furthermore, instead of being controlled every hour by the ES register, the accumulation time can be controlled every at most 1 H by changing the input pulse position of the selector circuit.

First, during the first operation of read from the pixel section 1 (t3), the pulse signals RESETn, READn, and ADRESn are supplied to the pixel section in synchronism with a horizontal synchronous pulse HP. Thus, signal charge accumulated through photoelectric conversion performed by the photo diodes PD is read. First, the reset level obtained by turning on and then turning off RESETn is loaded into the capacitance C1 in FIG. 2. For the readout, the amplitude of the reference waveform is set to an intermediate level. The intermediate level is automatically adjusted in the sensor so that a light shielding pixel (OB) section of the pixel section is set to 64 LSBs. Then, READn is turned on to apply an intermediate voltage Vm to allow output of a signal corresponding to at least about half of the saturation level of charge accumulated in PD. For the read signal, a signal obtained by adding the reset level and the signal level together is held in the capacitance C2 in FIG. 2. For the read signal, a triangular wave is generated during a period of 0.5 H corresponding to the former half of the horizontal scan period as a reference waveform, to carry out a 10-bit AD conversion. The signal (digital data) being subjected to the AD conversion is held in the latch circuit 4. After the AD conversion is finished, the signal is input to the line memory MSH5.

Subsequently, during the second operation of read from the pixel section 1 (t4), as is the case with the operation after the first 0.5 H, the reset level obtained by turning on and then turning off RESETn is loaded into the capacitance C1 in FIG. 2. Then, READn is turned on to apply a high voltage Vh to allow signal charge remaining in PD to be output. For the read signal, a signal obtained by adding the reset level and the signal level together is held in the capacitance C2 in FIG. 2. For the read signal, a triangular wave is generated during a period of 0.5 H corresponding to the latter half of the horizontal scan period as a reference waveform, to carry out a 10-bit AD conversion. The signal (digital data) being subjected to the AD conversion is held in the latch circuit 4. After the AD conversion is finished, the signal is input to the line memory MSL6.

During the next single horizontal scan period, the signals are simultaneously output by the two line memories MSH and MSL. The two signals are added together in pixel unit and synthesized into one signal. In the present operation, the two signals are added together to increase the signal level to 11 bits. At this time, random noise generated by the source follower circuit in the pixel section is averaged to improve SNR. Furthermore, signal resolution also increases from 10 bits to 11 bits. For high-speed operations, 9-bit ADC operations allow the operating frequency to be substantially doubled. In this case, the resolution of the signal is about 10 bits.

2-2. Read Potential

Now, with reference to a sectional view in FIG. 5, description will be given of the pixel section 1 and potentials observed at times t1 to t4 in the operational timing chart in the present example shown in FIG. 4.

Figure 5:
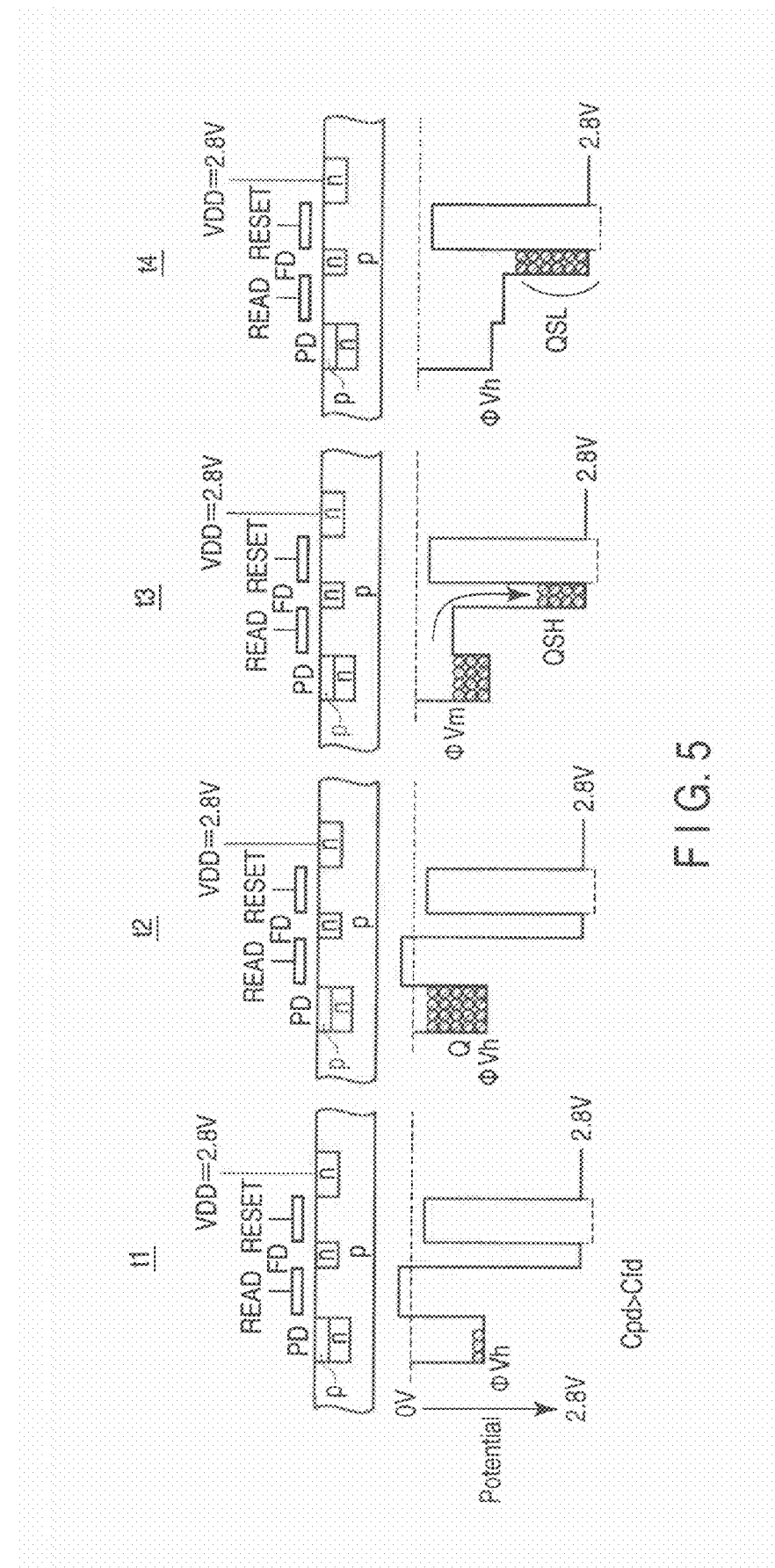
FIG. 5 is a sectional view of the pixel section and potentials observed at each time in the operational timing chart shown in FIG. 4.

As shown in FIG. 5, the photo diode PD is provided by forming an n-type impurity diffusion area on a p-type semiconductor substrate. The surface of the n-type impurity diffusion area is shielded by a p-type impurity diffusion area. Thus, a buried photo diode PD is formed which is unsusceptible to flaws and dark-time unevenness. The detection section FD is formed of an n-type impurity diffusion area. The detection section FD and the n-type impurity diffusion area of the photo diode PD serve as a source area and a drain area, respectively, of the read transistor (read gate) Td. A gate electrode formed of polysilicon is provided on the substrate between the n-type impurity diffusion areas via a gate insulating film (not shown in the drawings). The gate electrode is supplied with the read pulse READ. An n-type impurity diffusion area is provided adjacent to the n-type impurity diffusion area serving as the detection section FD. This n-type impurity diffusion area serves as a drain area of the reset transistor (reset gate) Tc. The n-type impurity diffusion area of the detection section FD serves as a source area of the reset transistor (reset gate) Tc. A drain voltage VD (=2.8 V, for example, VDD) is applied to the drain area of the reset transistor Tc. A gate electrode formed of polysilicon is provided on the substrate between the n-type impurity diffusion areas via a gate insulating film (not shown in the drawings). This gate electrode is supplied with the reset pulse RESET. The reset transistor Tc allows the detection section FD to be reset to the drain voltage VDD.

First, at a time t0 (not shown in the drawings), the optical input signal PD performs photoelectric conversion to start accumulating signal charge.

Subsequently, at times t1 and t2, the above-described signal accumulation operation is continued.

Subsequently, at time t3, to allow the signal charge accumulated in the photo diode PD section to be read, first, the RESET pulse is applied to the detection section to reset the detection section to a potential equal to the power supply voltage VDD=2.8 V. Then, a voltage Vm is applied to the READ electrode to allow the signal charge accumulated to at least about half of the saturation capacitance of the PD section to be read to the detection section FD.

Subsequently, at time t4, the RESET pulse is applied to the detection section to reset the detection section to a potential equal to the power supply voltage VDD=2.8 V. Then, the voltage Vh is applied to the READ electrode to allow the signal charge remaining in the PD section to be read to the detection section FD. The capacitance Cpd of the PD section is designed to be greater than that Cfd of the detection section. The small capacitance Cfd of the detection section allows a high voltage to be generated even with a small amount of signal charge. Thus, the adverse effect of noise from circuits located after the source follower circuit can be reduced. Doubling the conversion gain allows the adverse effect of noise from the succeeding circuits to be reduced to half. Furthermore, increasing the capacitance Cpd of the PD section enables an increase in the number of saturation electrons. This allows bright-time SNR to be improved. Doubling the number of saturation electrons allows a light shot to be generated at the square root of the signal level. This allows SNR to be improved by 3 dB.

<3. Effects>

The solid-state imaging device and the operation of the device according to the present embodiment exert at least effects (1) and (2) described below.

(1) Even if the signals resulting from the division are small, random noise can be reduced, and the S/N (Signal/Noise) ratio can advantageously be prevented from being reduced.

(1)-1: As described above, the solid-state imaging device in the present example comprises at least the pixel section 1 including the plurality of cells 11 arranged on the semiconductor substrate, the read pulse amplitude control circuit 41 configured to control the exposure time for which the photo diode performs photoelectric conversion and to divide the signal charge accumulated in the photo diode into fractions so that the fractions are read from the photo diode, and the addition circuit 20 configured to synthesize the plurality of read signals into one signal, the addition circuit 20 comprising the first determination circuit (first determination means) 22 configured to perform comparison of the signal level of the last (SL) of the plurality of read signals to determine whether or not to add any previously read signal (SH) to the last signal (SL).

More specifically, in the present example, the first determination circuit 22 comprises the comparator circuit COM11 and the switch SW11. The comparator circuit COM11 compares the signal SL read from the line memory MSL with the signal SLMax of the predetermined level. If the signal SL is greater than the signal SLMax, the control switch SW11 is set to the YES side. Thus, the signal SH is added to the signal SL. On the other hand, if the signal SL is smaller than the signal SLMax, the switch SW11 is set to the NO side. Thus, the signal SH is prevented from being added to the signal SL.

Thus, the configuration in the present example can perform control such that if the signal SL is smaller than the predetermined signal SLMax, the switch SW11 is set to the NO side to prevent the signal SH from being added to the signal SL. This in turn enables the mixture of random noise to be prevented.

As a result, even if the signals resulting from the division are small, random noise can be reduced. Thus, advantageously, the S/N (Signal/Noise) ratio is prevented from being reduced.

(1)-2: Moreover, the addition circuit 20 comprises the subtractor SU11 configured to carry out subtraction on one (SH) of the plurality of signals read from the photo diode PD which is different from the last signal (SL). More specifically, the signal SH read from the line memory MSH is input to the subtractor SU11, which first reduces the black level of the signal SH. For example, if the black level is set to 64 LSBs in the ADC count, subtraction is carried out on the 64 LSBs.

As a result, the addition can be carried out when an average value for a plurality of pixels located before and after the addition target pixel 11 is determined to be greater than the value of the black level. Therefore, random noise can be reduced.

(1)-3: Moreover, the addition circuit 20 comprises the clip circuit CL11 configured to clip a part of the output received from the subtractor SU11 which has a value of at most zero. More specifically, a minus signal input by the subtractor SU11 is clipped by then at-most-zero clip circuit CL11.

As a result, in the present example, random noise is reduced to about half.

(1)-4: Moreover, the addition circuit 20 comprises the switch SW12 configured to carry out switching such that when a high analog conversion gain for AD conversion is input, the read signal (SH) resulting from the division is prevented from being subjected to an addition process. More specifically, if the analog gain is at least doubled ($\geq \times 2$), the switch SW12 is set to the GND side so as to prevent the SH signal from being supplied to the addition circuit 20.

Thus, the SH signal is not substantially added. Random noise is advantageously reduced.

(2) The embodiment is advantageous for increasing sensitivity and a dynamic range.

As described above, the solid-state imaging device in the present example comprises the pulse amplitude control circuit 41 configured to control the exposure time for which the photo diode PD performs photoelectric conversion and to divide the signal charge accumulated in the photo diode PD into fractions so that the fractions are read from the photo diode PD.

Thus, the conversion gain of the detection section can be increased to reduce the adverse effect of random noise from the succeeding circuits. This is advantageous for increasing sensitivity. In addition, the number of saturation electrons in the photo diode PD can be increased. The embodiment is thus also advantageous for increasing the dynamic range.

Second Embodiment

An Example in which Four Signals Resulting from Division are Read

Now, a solid-state imaging device and the operation of the device according to a second embodiment will be described with reference to FIG. 6 and FIG. 7. The second embodiment relates to an example in which four signals resulting from division are read. In the description, components of the second embodiment which overlap those of the first embodiment will not be described in detail.

<Read Operation>

First, a read operation performed by the solid-state imaging device according to the second embodiment will be described with reference to FIG. 6. Here, the illustration and description of components of the second embodiment which overlap those of the first embodiment are omitted.

Figure 6:
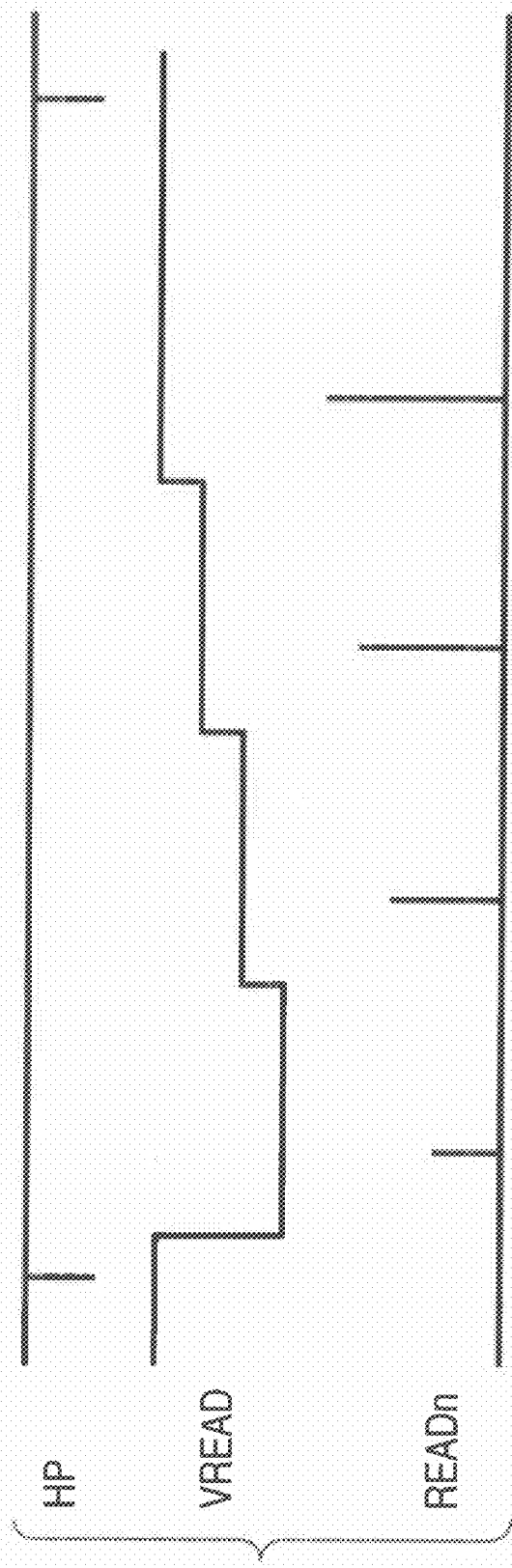
FIG. 6 is a diagram showing a read operation performed by a solid-state imaging device according to a second embodiment.

As shown in FIG. 6, READn has five values during one horizontal scan period (HP). Thus, an output VREAD voltage from a pulse control circuit 4 can be varied among four levels. Similarly, an ADC operation is performed four times <Configuration Example (Addition Circuit)>

Now, a configuration example of an addition circuit 20 according to the second embodiment will be described with reference to FIG. 7.

Figure 7:
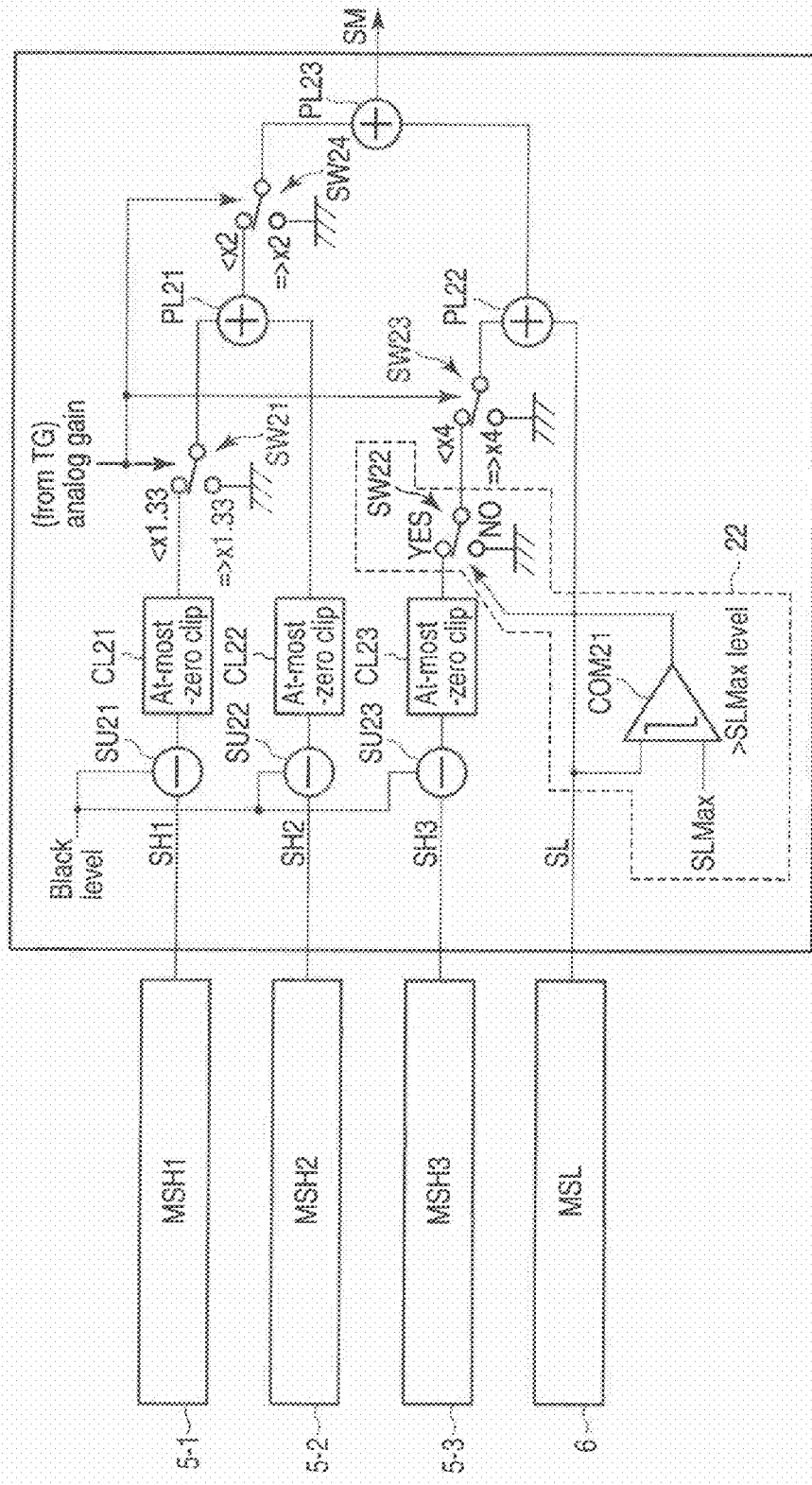
FIG. 7 is a diagram showing a configuration example of an addition circuit according to the second embodiment.

As shown in FIG. 7, the addition circuit 20 in the present example is different from that according to the above-described first embodiment in that four line memories (MSH1, MSH2, MSH3, and MSL) are provided in order to add together four signals resulting from division. The addition circuit 20 in the present example is further different from that according to the above-described first embodiment in that in association with the four line memories, subtractors SU21 to SU23, at-most-zero clip circuits CL21 to CL23, switches SW21 to SW23, and adders PL21 to PL23 are provided.

Signals accumulated in the photo diode PD are defined as signals SH1, SH2, SH3, and SL in order of decreasing signal level, and are accumulated in the respective line memories (MSH1, MSH2, MSH3, and MSL).

In association with the signals SH1 to SH3, as described above, subtractors SU21 to SU23 and clip circuits CL21 to CL23 are provided in order to carry out a black level subtraction process and an at-most-zero clipping process.

The configuration and operation of a determination circuit 22 are substantially similar to those described above. For example, when the maximum saturation signal for a photo diode PD is assumed to have a signal level of 10,000 ele, the saturation level of the SL signal is 2,500 ele. When SLMax is set to 2,000 ele, light shot noise is $\sqrt{(2000)}=45$ ele. Random noise is 1 ele, which is $\frac{1}{45}$ of the signal level of the light shot noise, and is still sufficiently low.

In the present example, when the signal is at least 2,000 ele, random noise increases by 1 ele. However, this adverse effect is very insignificant. Thus, a comparator circuit COM21 is provided only for the SL signal to perform a determination operation. However, the embodiments are not limited to the present configuration. Of course, comparator circuits may be provided for the signals SH2 and SH3, with a relevant determination circuit provided.

The values of the analog gain switchably input to the control switches SW21, SW23, and SW24 are set equal to the analog gain multiplied by four, two, and 1.33, respectively.

<Effects>

The solid-state imaging device and the operation of the device according to the second embodiment exert at least effects similar to (1) and (2) described above. Moreover, in the present example, the output VREAD voltage from the pulse control circuit 41 can be varied among the four levels. The four read signals can be added together. Thus, the present example can be applied as required.

Third Embodiment

An Example More Advantageous for Reducing Random Noise

Now, a solid-state imaging device according to a third embodiment will be described with reference to FIG. 8. The third embodiment relates to an example in which random noise can further be reduced. In the description, components of the third embodiment which overlap those of the first embodiment will not be described in detail.

<Configuration Example (Addition Circuit)>

A configuration example of an addition circuit 20 according to a third embodiment will be described with reference to FIG. 8.

Figure 8:
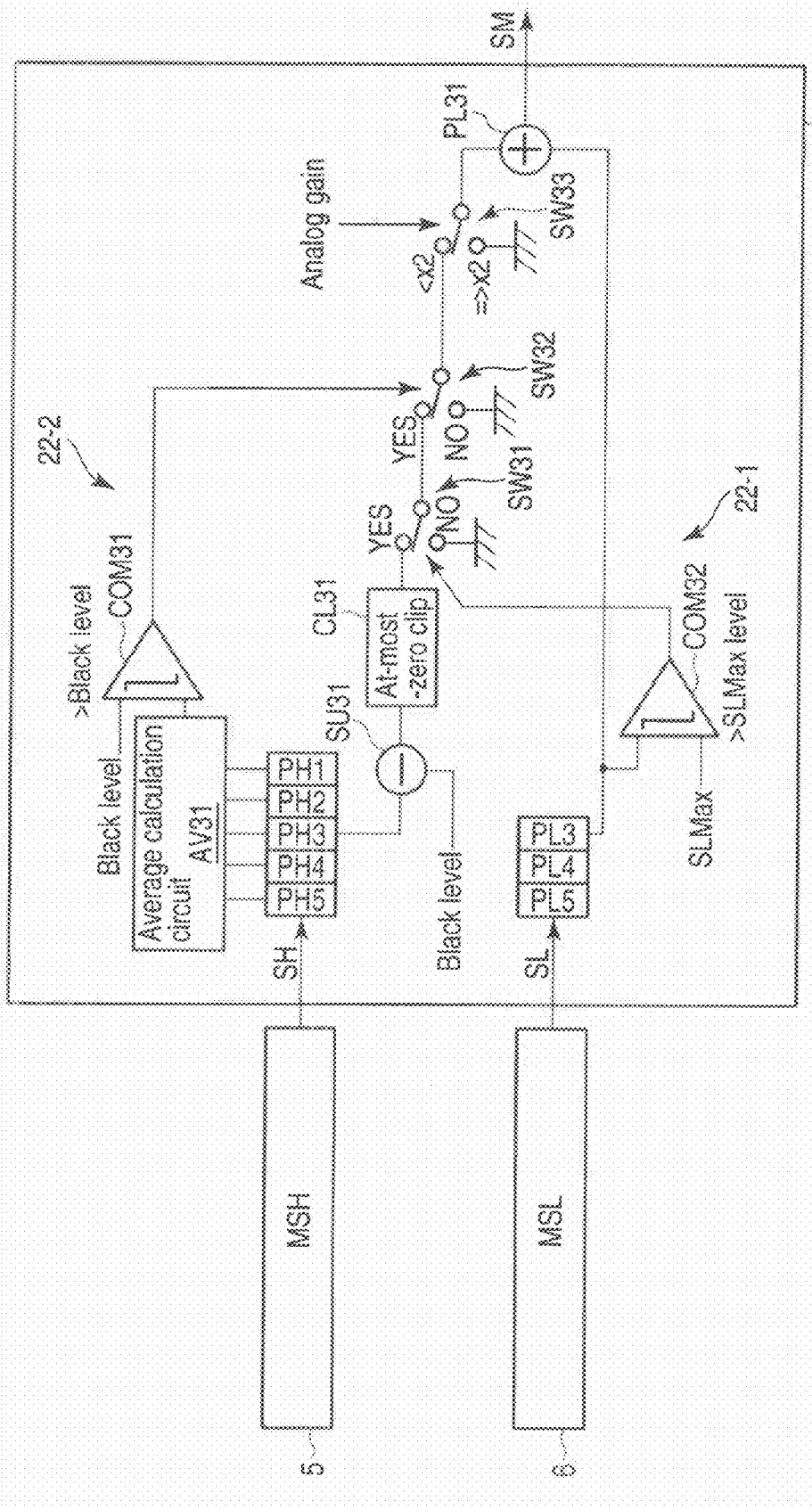
FIG. 8 is a diagram showing a configuration example of an addition circuit according to a third embodiment.

As shown in FIG. 8, the present example is different from the above-described first embodiment in that the addition circuit 20 comprises an average calculation circuit AV31 configured to calculate an average value for pixels and a first determination circuit 22-1 and a second determination circuit 22-2 arranged in line memories MSH and MSL, respectively.

For a signal SH read from the line memory MSH, five pixels in the same color signal (in the case of a Bayer array, four colors including Gr, R, B, and Gb) are input to an average calculation circuit AV31 configured to calculate an average value for five pixels PH1 to PH5.

The second determination circuit 22-2 comprises the average value calculation circuit AV31 configured to set a switch SW32 to a YES side if the average value input to the comparator COM31 is greater than the value of the black level, indicating the presence of a signal. On the other hand, if the input average value is smaller than the value of the black level (N), average calculation circuit AV31 in the second determination circuit 22-2 sets the switch SW32 to a GND side.

A signal SL is subjected to pixel delay so as be in phase with the signal SH and then output as a signal PL3. This processing allows the capability of detecting the presence of a signal to be improved. For example, in the present example, the capability is improved by a factor of $\sqrt{5}$=about 2.2, obtained by determining the square root for the five pixels. In the first embodiment, when the SL signal has a maximum value of about 5,000 ele, random noise of 1 ele is added to a signal of about 4,000 to 5,000 ele. However, the use of the second determination circuit 22-2 enables the addition of random noise of 1 ele to be substantially avoided. Moreover, the use of the second determination circuit 22-2 eliminates the need for the first determination circuit 22-1. Even if the maximum signal amount of a signal MSL varies among devices, the presence of a signal MSH can be accurately determined. This enables avoidance of an increase in random noise added when the MSH signal is absent.

The number of pixels for the averaging is not limited to five but may be set to any value equal to or larger than 2.

<Effects>

The solid-state imaging device and the operation of the device according to the third embodiment exert at least effects similar to (1) and (2) described above. Moreover, in the present example, the solid-state imaging device comprises the average calculation circuit AV31 configured to calculate the average value for pixels, and the first and second determination circuits 22-1 and 22-2 provided for the line memories MSH and MSL, respectively.

Thus, the third embodiment is further advantageous for avoiding an increase in random noise added when the MSH signal is absent.

Fourth Embodiment

An Example of Addition Carried Out by a Column ADC

Now, a solid-state imaging device according to a fourth embodiment will be described with reference to FIG. 9 to FIG. 11. The fourth embodiment relates to an example in which addition is carried out by a column ADC circuit. In the description, components of the fourth embodiment which overlap those of the first embodiment will not be described in detail.

<Configuration Example (ADC Circuit)>

First, a configuration example of a column ADC circuit in which addition can be carried out by a column ADC will be described with reference to FIG. 9.

Figure 9:
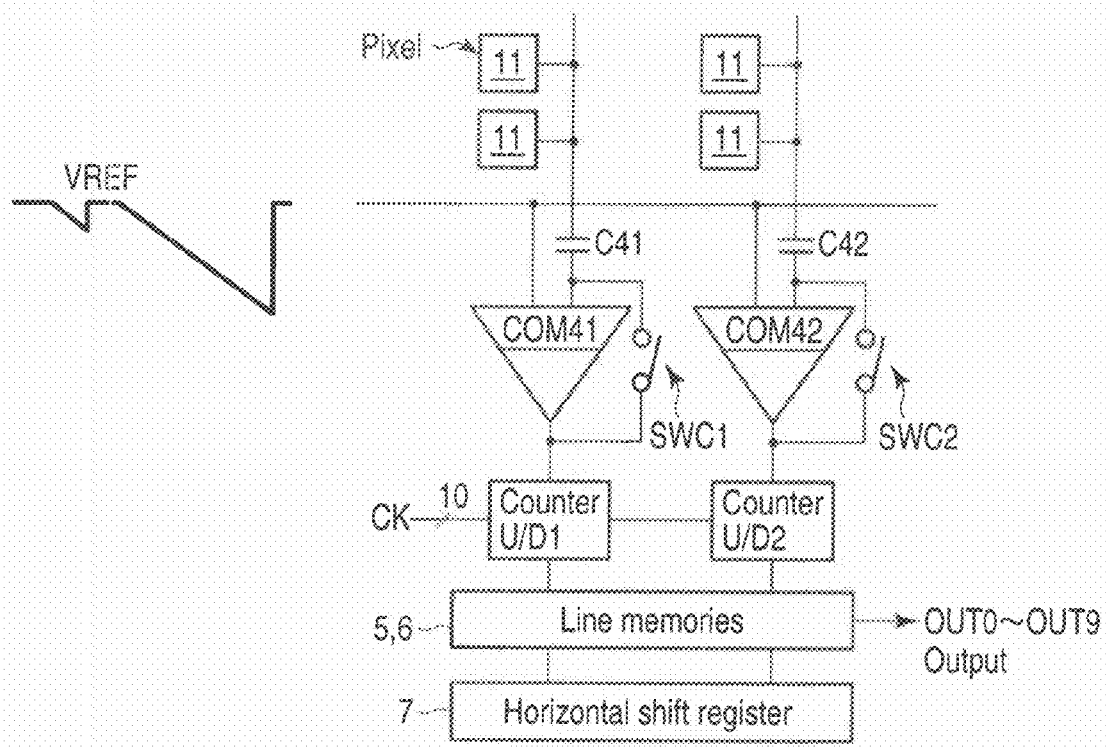
FIG. 9 is a diagram showing a configuration example of an ADC circuit according to a fourth embodiment.

As shown in FIG. 9, vertical signal lines VLin electrically connected to pixels 11 are connected to inputs of comparator circuits COM41 and COM42, respectively. The other input of each of the comparators COM41 and COM42 is connected to a reference waveform VREF for triangular waves. In the comparator circuits COM41 and COM42, the difference between an output VLin voltage and a VREF reference voltage obtained after resetting of a pixel detection section is held in input capacitances C41 and C42 of the comparator circuits (COM41 and COM42). Thereafter, the VLin voltage is changed by a signal read from a photo diode PD. When the changed signal level is equal to the VREF voltage, an output signal is output. Outputs from the comparators COM41 and COM42 change, for example, from "0" data to "1" data.

When the outputs from the comparators COM41 and COM42 change as described above, U/D (Up/Down) counter circuits U/D1 and U/D2 stop counting.

Count data from the counter circuits U/D1 and U/D2 is input and saved to line memories 5 and 6.

<Addition Operation (1)>

Now, an addition operation performed by a column ADC circuit 3 shown in FIG. 9 described above will be described with reference to FIG. 10.

Figure 10:
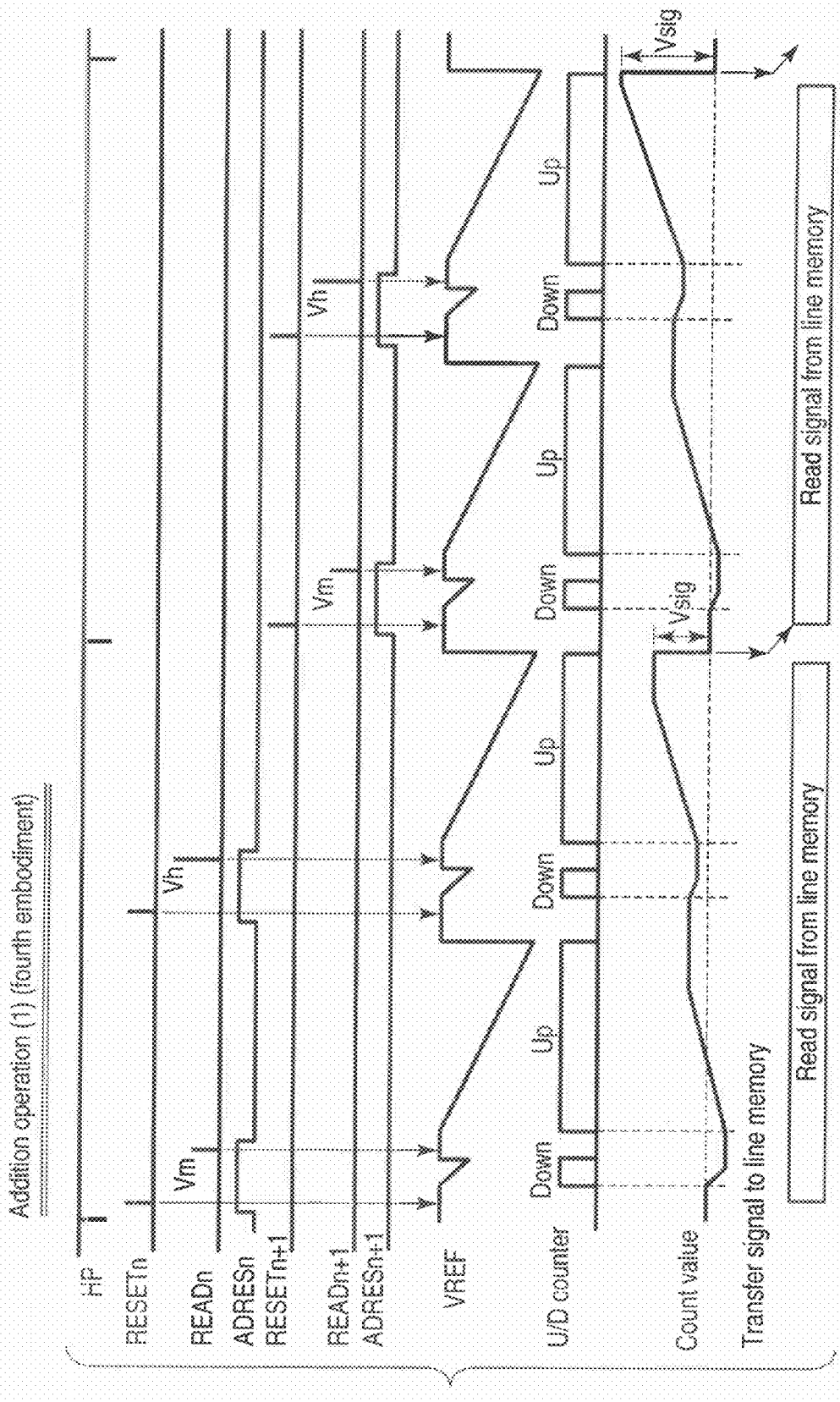
FIG. 10 is a diagram showing an addition operation performed by a column ADC circuit according to a fourth embodiment.

As shown in FIG. 10, first, RESETn resets the FD section.

This reset potential turns on ADRESn to make the read signal on the vertical signal line VLin electrically continuous. The read signal is thus output.

The output read signal is compared with the VREF voltage by the comparators COM41 and COM42. At this time, the U/D counter circuits U/D1 and U/D2 count down. When the input voltages (the signal level generated on VLin and the VREF voltage) to the comparators are equal, the U/D counter circuits U/D1 and U/D2 stop counting.

Then, a pixel section 1 applies a Vm voltage to READn to allow signals corresponding to about half of the saturation charge accumulated in the photo diode PD to be read. The detection section FD converts each signal into a voltage, and outputs the voltage to the vertical signal line VLin.

The output signal is compared with the VREF voltage by the comparators COM41 and COM42. At this time, the U/D counter circuits U/D1 and U/D2 count up. When the signal level generated on VLin is equal to the VREF voltage, the U/D counter circuits U/D1 and U/D2 stop counting.

The difference between the RESET level of the detection section FD and a source follower voltage is cancelled by the capacitances C41 and C42. The above-described counting down and up operations serve to cancel the difference in level between the two inputs to the comparators (COM41 and COM42). Thus, conventional noise like vertical stripes can be cancelled.

Similarly, during the latter half of one horizontal period HP, RESETn is used to reset the FD section again. ADRESn is turned on to output this reset potential to the vertical signal line VLin. The output signal is compared with the VREF voltage by the comparators COM41 and COM42. At this time, the comparison starts with the above-described initially obtained counter value. The U/D counter circuits U/D1 and U/D2 count down. When the signal level generated on VLin is equal to the VREF voltage, the U/D counter circuits U/D1 and U/D2 stop counting.

Then, the pixel section 1 applies a Vh voltage to READn to allow the signal charge remaining in the photo diode PD to be read to the detection section FD. The signal charge is converted into a voltage, which is then output to the vertical signal line VLin.

The output read signal is compared with the VREF voltage by the comparators COM41 and COM42. At this time, the U/D counter circuits U/D1 and U/D2 count up. When the signal level generated on VLin is equal to the VREF voltage, the U/D counter circuits U/D1 and U/D2 stop counting. This operation carries out divided read and addition of the signals in the photo diode PD section.

At the end of the horizontal period HP, count values resulting from similar ADC operations performed on the respective columns are simultaneously transferred to the line memories as Vsig.

Then, the count values are sequentially read during the next horizontal period and output from the sensor chip after the signal processing.

<No Addition Operation (2) (Double Gain)>

Now, the case where the column ADC circuit 3 shown in FIG. 10 avoids performing the addition operation as a result of an at least doubled analog gain will be described with reference to FIG. 11.

Figure 11:
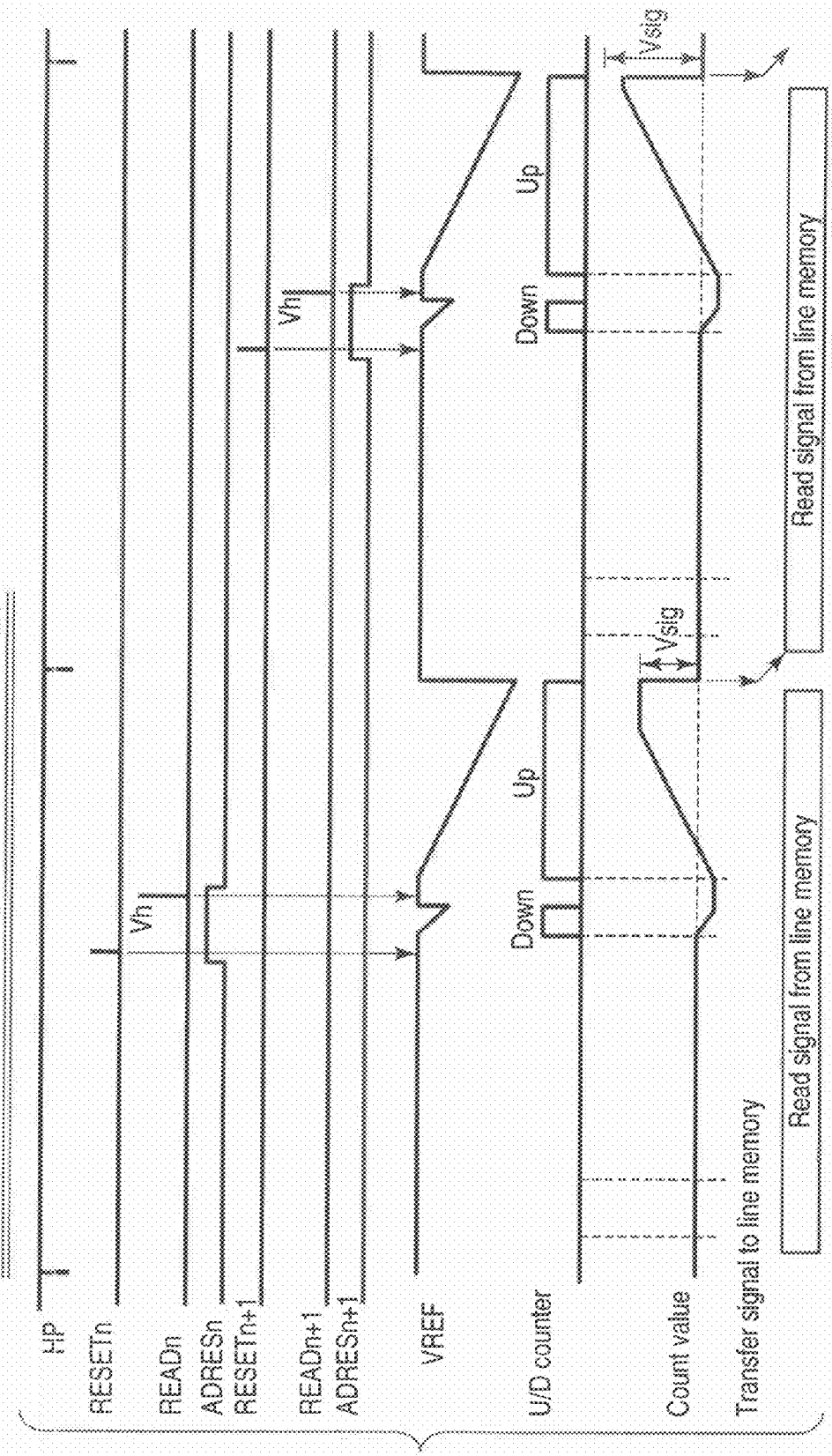
FIG. 11 is a diagram showing a case in which the addition operation shown in FIG. 10 is not performed as a result of an at least doubled analog gain.

As shown in FIG. 11, the present operation is different from the operation shown in FIG. 10 in that the operation during the former half of the horizontal scan period HP is turned off. Thus, the addition operation can be easily turned off by turning off the operation during the former half of the horizontal scan period HP. This enables an at least doubled analog gain to be dealt with.

The comparators COM41 and COM42 in the present example shown in FIG. 9 comprise no at-most-zero clip circuit or SLMax level determination circuit. Thus, about 2 ele of random noise may be added to degrade the resultant signal. However, the present configuration advantageously allows the addition operation to be easily performed without the need to increase the number of line memories. Of course, an operation similar to the one described above can be performed as follows. Additional line memories are provided, and an at-most-zero clip circuit, an SLMax level determination circuit 22, and the like which are similar to those described above are also provided. Signals are read from the line memories and then processed using the at-most-zero clip circuit and the SLMax level determination circuit 22.

<Effects>

The solid-state imaging device and the operation of the device according to the fourth embodiment exert at least effects similar to (1) and (2) described above. Moreover, a column ADC circuit in which a column ADC can be used to carry out addition is applicable as required as is the case with the present example.

[Modification (Another Configuration Example of Unit Pixels)]

A solid-state imaging device according to a modification will be described with reference to FIG. 12 to FIG. 14. The present modification relates to another configuration example of unit pixels 11. In the description, components of the modification which overlap those of the first embodiment will not be described in detail.

<Configuration Example of Pixels>

Pixel (1)

FIG. 12 shows Modification (1) of the pixel 11. FIG. 1 described above shows a pixel configuration of one pixel and one cell in which one output circuit is provided for one photo diode PD.

FIG. 12 shows a pixel configuration of two pixels and one cell in which one output circuit (transistor Ta or the like) is provided for two photo diodes PD.

Pixel (2)

FIG. 13 shows a pixel configuration of four pixels and one cell in which one output circuit (transistor Ta or the like) is provided for four photo diodes PD.

Pixel (3)

FIG. 14 shows a pixel configuration one pixel and one cell in which the address transistor Tb is omitted.

The configuration of the pixel 11 is not limited to those described above. The present example is of course applicable to a further modified pixel configuration.

If all of a large signal accumulated in the photo diode PD is read to the detection section at a time, then disadvantageously the signal may overflow the detection section and travel back to the photo diode PD or spread to surrounding photo diodes PD. In the embodiments, the signal is divided into two or four fractions before read-out by way of example. However, the division is not limited to these values. The signal may be read in any other number of plural read-out operations.

In addition, the first to fourth embodiments and modification are effectively applied to a back side illumination type (BSI) solid-state imaging device in which a light illumination surface corresponds to a semiconductor substrate surface (back surface) located opposite a semiconductor substrate surface (front surface) on which a signal scanning circuit and a wiring layer for the circuit are arranged. In the back side illumination type (BSI) solid-state imaging device, light incident on the pixel can reach a light reception area in the semiconductor substrate without being obstructed by the wiring layer or the like. Thus, a high quantum efficiency can be advantageously achieved even for fine pixels.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:

a pixel section comprising a plurality of cells arranged on a semiconductor substrate and each comprising a photo diode configured to photoelectrically convert an optical signal into a signal charge, a read unit which reads the signal charge generated by the photo diode, out to a detection section, a output unit which converts the signal charge into a voltage corresponding to a charge amount and then outputting the voltage, and a reset unit which resets the detection section;

a read pulse amplitude control unit which controls exposure time for which the photo diode carries out the photoelectric conversion and dividing the signal charge accumulated in the photo diode into fractions so that the fractions are read from the photo diode;

a plurality of line memories to which the plurality of read signals are saved; and an addition unit which synthesizes the plurality of read signals into one signal, the addition unit comprising a determination unit which reads the signal saved to a predetermined line memory and comparing a signal level of the read signal with a predetermined level to determine whether or not to add a signal read from a different line memory to the compared signal, wherein the addition unit further comprises a control switch configured to perform switching such that when a high conversion gain for AD conversion is input, execution of a process of adding together the signals resulting from dividing the signal charges into fractions is avoided.

2. A solid-state imaging device comprising:

a pixel section comprising a plurality of cells arranged on a semiconductor substrate and each comprising a photo diode configured to photoelectrically convert an optical signal into a signal charge, a read unit which reads the signal charge generated by the photo diode, out to a detection section, a output unit which converts the signal charge into a voltage corresponding to a charge amount and then outputting the voltage, and a reset unit which resets the detection section;

a read pulse amplitude control unit which controls exposure time for which the photo diode carries out the photoelectric conversion and dividing the signal charge accumulated in the photo diode into fractions so that the fractions are read from the photo diode;

a plurality of line memories to which the plurality of read signals are saved; and an addition unit which synthesizes the plurality of read signals into one signal, the addition unit comprising first determination unit which reads the signal saved to a predetermined line memory and comparing a signal level of the read signal with a predetermined level to determine whether or not to add a signal read from a different line memory to the compared signal, wherein the addition unit further comprises an average calculation circuit configured to calculate an average value for a plurality of horizontal pixels in the plurality of signals read from the photo diode and which are other than the last signal read from the photodiode, and a second determination unit which carries out an addition process on the input signals if the result of the average calculation indicates that the average value is larger than the value of a black level.

* * * * *